(12) United States Patent
Kim et al.

(10) Patent No.: US 10,038,227 B2
(45) Date of Patent: Jul. 31, 2018

(54) METHOD OF MANUFACTURING SECONDARY BATTERY AND SECONDARY BATTERY USING THE SAME

(71) Applicant: LG Chem, Ltd., Seoul (KR)

(72) Inventors: Jihyun Kim, Daejeon (KR); Youn Kyoung Lee, Daejeon (KR)

(73) Assignee: LG Chem, Ltd. (KR)

( * ) Notice: Subject to any disclaimer, the term of this patent is extended or adjusted under 35 U.S.C. 154(b) by 223 days.

(21) Appl. No.: 14/766,018

(22) PCT Filed: Apr. 29, 2014

(86) PCT No.: PCT/KR2014/003750
§ 371 (c)(1),
(2) Date: Aug. 5, 2015

(87) PCT Pub. No.: WO2014/178594
PCT Pub. Date: Nov. 6, 2014

(65) Prior Publication Data
US 2016/0211557 A1 Jul. 21, 2016

(30) Foreign Application Priority Data
Apr. 30, 2013 (KR) .................. 10-2013-0048047

(51) Int. Cl.
*H01M 10/052* (2010.01)
*H01M 10/52* (2006.01)
*H01M 10/058* (2010.01)
*H01M 4/505* (2010.01)
*H01M 4/525* (2010.01)
*H01M 2/34* (2006.01)
*H01M 4/04* (2006.01)
*H01M 4/30* (2006.01)
*H01M 4/02* (2006.01)

(52) U.S. Cl.
CPC ......... *H01M 10/526* (2013.01); *H01M 4/505* (2013.01); *H01M 4/525* (2013.01); *H01M 10/052* (2013.01); *H01M 10/058* (2013.01); *H01M 2/345* (2013.01); *H01M 4/043* (2013.01); *H01M 4/30* (2013.01); *H01M 2004/027* (2013.01)

(58) Field of Classification Search
CPC .. H01M 10/52; H01M 10/526; H01M 10/523; H01M 4/30
See application file for complete search history.

(56) References Cited

U.S. PATENT DOCUMENTS

| 2003/0008213 A1 | 1/2003 | Cho | |
|---|---|---|---|
| 2011/0059355 A1* | 3/2011 | Zhang | H01M 4/8647 429/188 |
| 2011/0318651 A1* | 12/2011 | Leitner | H01M 4/0435 429/320 |
| 2012/0264022 A1* | 10/2012 | Hosoe | H01G 9/016 429/245 |
| 2015/0171461 A1* | 6/2015 | Akutsu | H01M 10/04 29/623.2 |

FOREIGN PATENT DOCUMENTS

| JP | 2002003220 A | 1/2002 |
|---|---|---|
| JP | 2005116235 A | 4/2005 |
| KR | 20010045712 A | 6/2001 |
| KR | 20020089649 A | 11/2002 |
| KR | 20100081455 A | 7/2010 |
| KR | 20120043981 A | 5/2012 |

OTHER PUBLICATIONS

Manickam, et al., "Lithium intercalation cells LiMn2O4/LiTi2O4 without metallic lithium." Journal of Power Sources 114 (2003), pp. 298-302.
Jeon, et al, "Electrochemical Characteristics of LiNi0.5Mn1.5O4 Spinel as 5 V Class Cathode Material for Lithium Secondary Batteries." Journal of the Korean Electrochemical Society, vol. 8, No. 4, 2005, 172-176. (English translation of Abstract only.).
International Search Report for Application No. PCT/KR2014/003750 dated Aug. 11, 2014.

* cited by examiner

*Primary Examiner* — Jeremiah R Smith
(74) *Attorney, Agent, or Firm* — Lerner, David, Littenberg, Krumholz & Mentlik, LLP

(57) ABSTRACT

Disclosed are a method of manufacturing a secondary battery having an electrode assembly sealed therein including:
(a) sealing a battery case after introducing an electrode assembly having a structure, in which a separator is interposed between a positive electrode and a negative electrode, and an electrolyte thereinto; and
(b) removing gases generated at an abnormal operation state of a battery or high temperature from an internal battery environment by pressing both sides of the battery case having the electrode assembly embedded therein in the sealing (a) to increase internal pressure of the battery case in the sealing,
wherein the electrode assembly includes a spinel-structure lithium nickel manganese composite oxide as a positive electrode active material and a lithium metal oxide as a negative electrode active material.

9 Claims, 2 Drawing Sheets

[ FIG. 1 ]
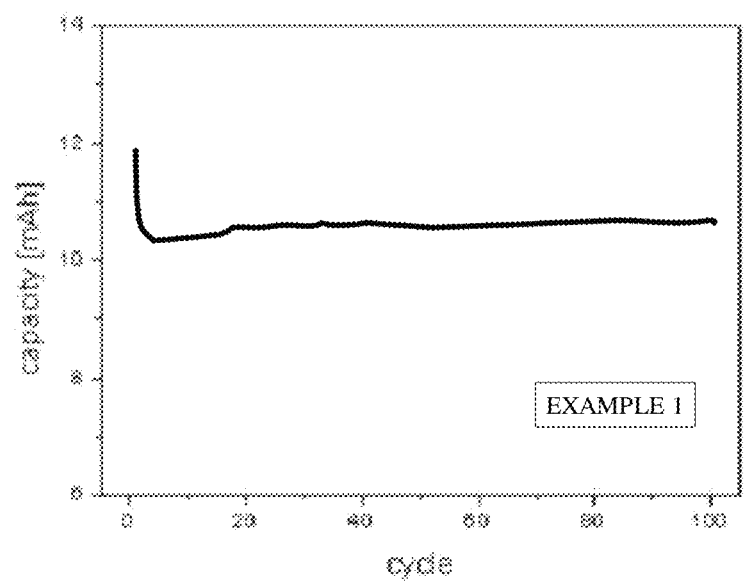
[ FIG. 2 ]
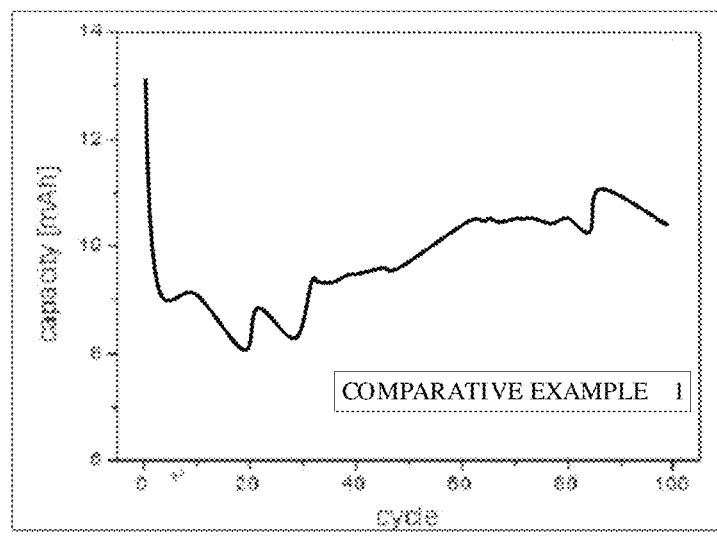

[ FIG. 3 ]
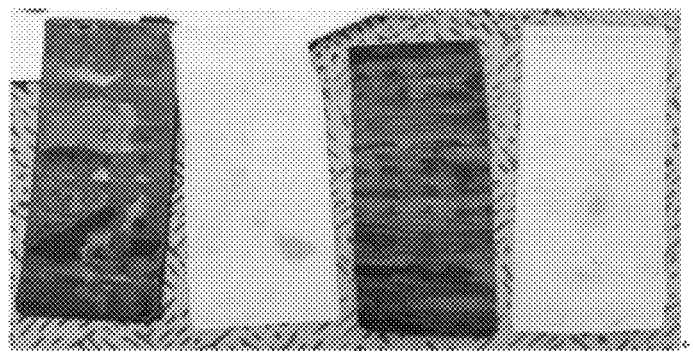
[ FIG. 4 ]
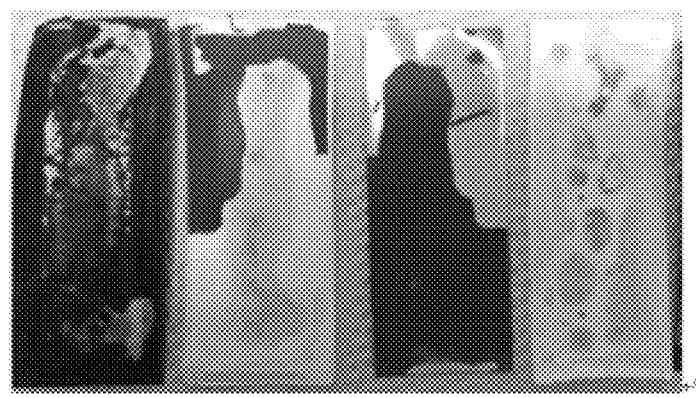

METHOD OF MANUFACTURING SECONDARY BATTERY AND SECONDARY BATTERY USING THE SAME

CROSS-REFERENCE TO RELATED APPLICATION

This application is a national phase entry under 35 U.S.C. § 371 of International Application No. PCT/KR2014/003750, filed Apr. 29, 2014, which claims priority to Korean Patent Application No. 10-2013-0048047, filed on Apr. 30, 2013, the disclosures of which are incorporated herein by reference.

TECHNICAL FIELD

The present invention relates to a method of manufacturing a secondary battery having an electrode assembly sealed therein and a secondary battery using the same.

BACKGROUND ART

As mobile device technology continues to develop and demand therefor continues to increase, demand for secondary batteries as energy sources is rapidly increasing. Among these secondary batteries, lithium secondary batteries, which exhibit high energy density and voltage and have long cycle lifespan and a low self-discharge rate, are commercially available and widely used.

However, conventional lithium secondary batteries may catch fire or explode when exposed to high temperature. In addition, when a large amount of current flows in a short time due to overcharging, external short circuit, nail penetration, crushing, or the like, the batteries are heated due to IR heat and, as such, the batteries may catch fire or explode.

That is, as the temperature of the battery is increased, reaction between the electrolyte and the electrodes is accelerated. As a result, reaction heat is generated and, thus, the temperature of the battery is further increased, which accelerates the reaction between the electrolyte and the electrodes. This feedback loop causes a thermal runaway phenomenon in which the temperature of the battery is sharply increased. When the temperature of the battery is increased to a predetermined temperature level, the battery may catch fire. In addition, as a result of the reaction between the electrolyte and the electrodes, gas is generated and, thus, the internal pressure of the battery is increased. When the internal pressure of the battery is increased to a predetermined pressure level, the lithium secondary batteries may explode.

Lithium metal oxides most widely used as a positive electrode of lithium secondary batteries are generally formed by reacting lithium carbonate and carbonate. When a stoichiometric amount of the lithium carbonate is increased, a residue of the lithium carbonate is decomposed and, thus, a variety of gases such as carbon dioxide, carbon monoxide, hydrogen, and the like are generated.

Meanwhile, an electrolyte reacts with impurities and lithium ions on a negative electrode surface of batteries even during initial charging and, thus, the electrolyte is also decomposed during formation of a solid electrolyte film, followed by generation of gases.

Gases such as carbon dioxide and the like generated within a battery may be reversibly returned to original materials during charging according to conditions. However, in most cases, the generated gasses remain within a battery in a gaseous state, thereby increasing internal pressure of the battery and causing swelling of the battery. The thickness of the swelled battery is increased and, as such, the thickened battery may not be easily installed in electric and electronic devices. Alternatively, due to a bulged appearance of the battery, the battery is judged to be defective and, thus, commercial value thereof is lost.

Therefore, one particular essentially considered to develop a lithium secondary battery is to secure stability by preventing or removing generation of inner gases inducing ignition/explosion and swelling at high temperature.

In efforts to secure such stability, there are conventionally a method of installing a device outside a cell and a method of using a particular material within a cell. However, such methods do not perform a normal protection role in cases requiring fast response time such as internal short circuit, needle penetration, local damage, and the like and performance of the battery may also be deteriorated due to addition of the material.

Therefore, there is an urgent need for development of new technology to prevent ignition/explosion due to gas generation without deterioration of overall battery performance.

DISCLOSURE

Technical Problem

The present invention aims to address the aforementioned problems of the related art and to achieve technical goals that have long been sought.

As a result of a variety of extensive and intensive studies and experiments, the inventors of the present invention confirmed that, as described below, when a secondary battery is manufactured including pressing both sides of a battery case having an electrode assembly embedded therein to increase internal pressure of a battery case, gases generated during charge and discharge of the battery are removed and, thus, desired effects may be achieved, thereby completing the present invention.

Technical Solution

In accordance with one aspect of the present invention, provided is a method of manufacturing a secondary battery having an electrode assembly sealed therein, the method including:

(a) sealing a battery case after introducing an electrode assembly having a structure, in which a separator is interposed between a positive electrode and a negative electrode, and an electrolyte thereinto; and (b) removing gases generated at an abnormal operation state of a battery or high temperature from an internal battery environment by pressing both sides of the battery case having the electrode assembly embedded therein in the sealing (a) to increase internal pressure of the battery;

wherein the electrode assembly includes a spinel-structure lithium nickel manganese composite oxide represented by Formula 1 below as a positive electrode active material and a lithium metal oxide represented by Formula 2 below as a negative electrode active material:

  (1)

wherein $0.9 \leq x \leq 1.2$, $0 < y < 2$, and $0 \leq z < 0.2$,

M is at least one element selected from the group consisting of Al, Mg, Ni, Co, Fe, Cr, V, Ti, Cu, B, Ca, Zn, Zr, Nb, Mo, Sr, Sb, W, Ti and Bi;

A is at least one monovalent or divalent anion;

  (2)

wherein M' is at least one element selected from the group consisting of Ti, Sn, Cu, Pb, Sb, Zn, Fe, In, Al and Zr;

0.1≤a≤4 and 0.2≤b≤4, wherein a and b are determined according to oxidation number of M';

0≤c<0.2, wherein c is determined according to oxidation number of A; and

A is at least one monovalent or divalent anion.

Since the method according to the present invention includes pressing the battery case to increase internal pressure thereof, gas generation within battery case may be inhibited according to Le Châtelier's principle. Le Châtelier's principle related to thermodynamic equilibrium shift is widely known in the art. Accordingly, detailed descriptions thereof will be omitted.

In addition, carbon dioxide previously generated may move to a negative electrode through a pressing process. The gases moved to the negative electrode may be consumed by being reduced due to low voltage of the negative electrode.

In the present invention, the expression "gases" means gases such as carbon monoxide, carbon dioxide, hydrogen, and the like which may be generated when temperature of a battery is higher than that at a normal operation state due to abnormal reactions such as overcharge, external or internal short circuit, needle penetration, local damage, and the like of an electrolyte and/or an electrode during an operation process of a battery.

In particular, since, in the present invention, high voltage may be maintained, lithium titanium oxide as a negative electrode active material is used so as to exhibit high capacity and excellent output characteristics, and the spinel-structure lithium nickel manganese composite oxide having a high electric potential of 4.7 V is also used, generation of by-products such as gases due to oxidation of an electrolyte, which may be exhibited when the electrode active material exhibiting a high electric potential is used including the process of removing gases as described above, may be prevented and, thus, stability may be improved.

In particular, the oxide of Formula 1 may be represented by Formula 3 below:

$$Li_xNi_yMn_{2-y}O_4 \quad (3)$$

wherein 0.9≤x≤1.2 and 0.4≤y≤0.5.

More particularly, the oxide of Formula 1 may be $LiNi_{0.5}Mn_{1.5}O_4$ or $LiNi_{0.4}Mn_{1.6}O_4$.

In addition, the oxide of Formula 2 may be particularly represented by Formula 4 below.

$$Li_aTi_bO_4 \quad (4)$$

wherein 0.5≤a≤3 and 1≤b≤2.5.

More particularly, the lithium metal oxide may be $Li_{1.33}Ti_{1.67}O_4$ or $LiTi_2O_4$.

The lithium titanium oxide has high electric potential with respect to lithium as compared to graphite and exhibits high safety since a reaction product of the electrolyte and lithium titanium oxide are not deposited at an interface therebetween. However, the lithium titanium oxide has a high electric potential of approximately 1.5 V with respect to lithium, and thus, when lithium titanium oxide is used together with a positive electrode active material that is commonly used in the art, such as lithium cobalt oxide or the like, a discharge voltage of a battery cell drops to about 2.4 V. In addition, lithium titanium oxide has a theoretical capacity of 175 mAh/g, which is similar to that of graphite, and thus improvement in energy density is limited.

Accordingly, the lithium titanium oxide as a negative electrode active material and the spinel-structure lithium nickel manganese composite oxide having a high electric potential of 4.7 V are used in the present invention and, as such, high voltage may be maintained and high capacity and excellent output characteristics may be exhibited.

However, as described above, an electrolyte is oxidized when an electrode active material exhibiting a high electric potential is used, and, as such, generation of by-products such as gases and the like may be further intensified. Therefore, the present invention includes removing such gases and, thus, high capacity and excellent output characteristics may be exhibited and stability may be further improved.

A method of preparing the oxide defined above is publicly known in the art. Therefore, detailed description thereof will be omitted in the present specification.

In the removing (b), the applied pressure may be 2 to 10 atm, more particularly 3 to 8 atm. Since a diameter of a central portion of the battery case becomes excessively small when the applied pressure is excessively large, the embedded electrode assembly may be undesirably damaged. On the other hand, when the diameter is excessively small, intended effects of the present invention may not be sufficiently exhibited.

The pressure application may be performed according to a variety of methods known in the art. For example, a cell may be inserted into a predetermined instrument to increased internal pressure of the instrument. In more detail, both sides of the battery case may be pressed with a compression plate.

Generally, the secondary battery is classified into, according to a shape of a battery case, a cylindrical battery, in which an electrode assembly is embedded in a cylindrical metal can, a rectangular battery, in which an electrode assembly is embedded in a rectangular metal can, and a pouch type battery, in which an electrode assembly is embedded in a pouch type case of an aluminum laminate sheet.

Since the manufacturing method according to the present invention includes applying pressure to a battery case, a battery case composed of a rectangular or cylindrical metal can may be used.

The present invention provides a secondary battery manufactured according to the method.

Since such a secondary battery was pressed, as described above, during a manufacturing process thereof, the amount of gases existing inside the battery may be 5 to 60%, particularly 5 to 40% based on a total weight of gases existing inside a battery case of a secondary battery which is not pressed.

Internal pressure of the battery case of the secondary battery pressed as described above may be 1.2 to 10 atm, particularly 3 to 8 atm due to the gases existing within the battery case.

The secondary battery may be a lithium secondary battery.

The lithium secondary battery according to the present invention includes a positive electrode, which is prepared by coating a mixture of the positive electrode active material, a conductive material, and a binder on a positive electrode current collector and then drying and pressing the coated a positive electrode current collector, and an a negative electrode, which is prepared by coating a mixture of the negative active material and a binder on a negative electrode current collector and then drying and pressing the coated negative active material. In this case, the mixture may further include a filler as desired.

The positive electrode current collector is generally fabricated to a thickness of 3 to 500 μm. The positive electrode current collector is not particularly limited so long as it does not cause chemical changes in the fabricated secondary battery and has high conductivity. For example, the positive electrode current collector may be made of stainless steel, aluminum, nickel, titanium, sintered carbon, or aluminum or stainless steel surface-treated with carbon, nickel, titanium, silver, or the like. The positive electrode current collector may have fine irregularities at a surface thereof to increase adhesion between the positive electrode active material and the positive electrode current collector. In addition, the positive electrode current collector may be used in any of various forms including films, sheets, foils, nets, porous structures, foams, and non-woven fabrics.

As the positive electrode active material, the materials as defined above may be used. In addition, examples of the positive electrode active material may include, but are not limited to, layered compounds such as lithium cobalt oxide ($LiCoO_2$) and lithium nickel oxide ($LiNiO_2$), or compounds substituted with one or more transition metals; lithium manganese oxides such as compounds of Formula $Li_{1+x}Mn_{2-x}O_4$ where $0 \leq x \leq 0.33$, $LiMnO_3$, $LiMn_2O_3$, and $LiMnO_2$; lithium copper oxide ($Li_2CuO_2$); vanadium oxides such as $LiV_3O_8$, $LiV_3O_4$, $V_2O_5$, and $Cu_2V_2O_7$; Ni-site type lithium nickel oxides having the formula $LiNi_{1-x}M_xO_2$ where M=Co, Mn, Al, Cu, Fe, Mg, B, or Ga, and $0.01 \leq x \leq 0.3$; lithium manganese composite oxides having the formula $LiMn_{2-x}M_xO_2$ where M=Co, Ni, Fe, Cr, Zn, or Ta, and $0.01 \leq x \leq 0.1$ or the formula $Li_2Mn_3MO_8$ where M=Fe, Co, Ni, Cu, or Zn; $LiMn_2O_4$ where some of the Li atoms are substituted with alkaline earth metal ions; disulfide compounds; and $Fe_2(MoO_4)_3$ within a range of 30 to 50 wt % based on a total weight of the positive electrode active material.

The conductive material is typically added in an amount of 1 to 50 wt % based on the total weight of the mixture including the positive electrode active material. There is no particular limit as to the conductive material, so long as it does not cause chemical changes in the fabricated battery and has conductivity. Examples of conductive materials include graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

The binder is a component assisting in binding between an active material and the conductive material and in binding of the active material to a current collector. The binder is typically added in an amount of 1 to 50 wt % based on the total weight of the mixture including the positive electrode active material. Examples of the binder include, but are not limited to, polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluorine rubber, and various copolymers.

The filler is optionally used as a component to inhibit a positive electrode expansion. The filler is not particularly limited so long as it is a fibrous material that does not cause chemical changes in the fabricated battery. Examples of the filler include olefin-based polymers such as polyethylene and polypropylene; and fibrous materials such as glass fiber and carbon fiber.

The negative electrode collector is generally fabricated to a thickness of 3 to 500 µm. The negative electrode collector is not particularly limited so long as it does not cause chemical changes in the fabricated lithium secondary battery and has conductivity. For example. For example, the negative electrode current collector may be made of copper, stainless steel, aluminum, nickel, titanium, sintered carbon, copper or stainless steel surface-treated with carbon, nickel, titanium, or silver, and aluminum-cadmium alloys. Similar to the positive electrode current collector, the negative electrode current collector may also have fine irregularities at a surface thereof to enhance adhesion between the negative electrode current collector and the negative electrode active material and be used in various forms including films, sheets, foils, nets, porous structures, foams, and non-woven fabrics.

As the negative electrode active material, the materials as defined above may be used. Examples of the negative electrode active material include, but are not limited to, carbon such as hard carbon and graphite-based carbon; metal composite oxides such as $Li_xFe_2O_3$ where $0 \leq x \leq 1$, $Li_xWO_2$ where $0 \leq x \leq 1$, $Sn_xMe_{1-x}Me'_yO_z$ where Me: Mn, Fe, Pb, or Ge; Me': Al, B, P, Si, Groups I, II and III elements, or halogens; $0 \leq x \leq 1$; $1 \leq y \leq 3$; and $1 \leq z \leq 8$; lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; Li—Co—Ni-based materials, within a range of 30 to 50 wt % based on the total weight of the negative electrode active material.

The secondary battery may have a structure in which an electrode assembly including a separator disposed between the positive electrode and the negative electrode is impregnated with the electrolyte containing a lithium salt.

The separator is disposed between the positive electrode and the negative electrode and, as the separator, a thin insulating film with high ion permeability and high mechanical strength is used. The separator generally has a pore diameter of 0.01 to 10 µm and a thickness of 5 to 300 µm. As the separator, for example, sheets or non-woven fabrics, made of an olefin-based polymer such as polypropylene; or glass fibers or polyethylene, which have chemical resistance and hydrophobicity, are used. When a solid electrolyte such as a polymer or the like is used as an electrolyte, the solid electrolyte may also serve as a separator.

The lithium salt-containing electrolyte consists of an electrolyte and a lithium salt. The electrolyte may be a non-aqueous organic solvent, an organic solid electrolyte, an inorganic solid electrolyte, or the like, but the present invention is not limited thereto.

Examples of the non-aqueous organic solvent include non-protic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include, but are not limited to, nitrides, halides and sulfates of lithium (Li) such as $Li_3N$, $LiI$, $Li_5NI_2$, $Li_3N-LiI-LiOH$, $LiSiO_4$, $LiSiO_4-LiI-LiOH$, $Li_2SiS_3$, $Li_4SiO_4$, $Li_4SiO_4-LiI-LiOH$, and $Li_3PO_4-Li_2S-SiS_2$.

The lithium salt is a material that is readily soluble in the non-aqueous electrolyte and examples thereof include, but are not limited to, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium tetraphenyl borate, and imides.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the electrolyte. If necessary, in order to impart incombustibility, the electrolyte may further include halogen-containing solvents such as carbon tetrachloride and ethylene trifluoride. Further, in order to improve high-temperature storage characteristics, the non-aqueous electrolyte may further include carbon dioxide gas, fluoro-ethylene carbonate (FEC), propene sultone (PRS), or the like.

In one desirable embodiment, the lithium salt-containing non-aqueous electrolyte may be prepared by adding a lithium salt such as $LiPF_6$, $LiClO_4$, $LiBF_4$, $LiN(SO_2CF_3)_2$, or the like to a mixed solvent including EC or PC, which is a high dielectric solvent and a cyclic carbonate, and DEC, DMC, or EMC, which is a low viscosity solvent and a linear carbonate.

In addition, a battery module including the secondary battery as a unit cell and the battery pack including battery module may be manufactured.

The battery pack may be used as a power source for medium and large devices that require stability at high temperature, long cycle life, and high rate characteristics.

Examples of such medium and large devices include, but are not limited to, electric motor-driven power tools; electric vehicles (EVs), hybrid electric vehicles (HEVs), and plug-in hybrid electric vehicles (PHEVs); electric two-wheeled vehicles such as e-bikes and e-scooters; electric golf carts; and systems for storing power.

BRIEF DESCRIPTION OF THE DRAWINGS

The above and other objects, features and other advantages of the present invention will be more clearly understood from the following detailed description taken in conjunction with the accompanying drawing, in which:

FIG. 1 is a graph illustrating cycle characteristics of a secondary battery according to Example 1 in Experimental Example 1 of the present invention;

FIG. 2 is a graph illustrating cycle characteristics of a secondary battery according to Comparative Example 1 in Experimental Example 1 of the present invention;

FIG. 3 is a photograph illustrating separators of a secondary battery according to Example 1 in Experimental Example 2 of the present invention; and FIG. 4 is a photograph illustrating separators of a secondary battery according to Comparative Example 1 in Experimental Example 2 of the present invention

MODE FOR INVENTION

Now, the present invention will be described in more detail with reference to the following examples. These examples are provided only for illustration of the present invention and should not be construed as limiting the scope and spirit of the present invention.

Example 1

(a) A positive electrode mixture was prepared by adding 90 wt % of $LiNi_{0.5}Mn_{0.5}O_4$ as a positive electrode active material), 5 wt % of Super-P as a conductive material), and 5 wt % of PVdF as a binder to NMP. Subsequently, the resultant mixture was coated, dried, and pressed over an aluminum collector in a loading amount of 1.2 $mAh/cm^2$, thereby completing preparation of a positive electrode for a secondary battery. 83 wt % of $Li_{1.33}Ti_{1.67}O_4$ as a negative electrode active material, 5 wt % of Super-P as a conductive material, and 12 wt % of PVdF as a binder were added to NMP, thereby completing preparation of a negative electrode mixture. Subsequently, the resultant mixture was coated, dried, and pressed over an aluminum collector in a loading amount of 1.1 $mAh/cm^2$, thereby completing preparation of a negative electrode. So as to prepare an electrolyte for a secondary battery, 1 M $LiPF_6$ was added to a solvent of ethylene carbonate (EC):dimethyl carbonate (DMC):ethyl methyl carbonate (EMC)=3:4:3. A porous separator manufactured using polypropylene was interposed between the positive electrode and the negative electrode, thereby completing manufacture of an electrode assembly. Subsequently, the electrolyte for the secondary battery was injected into the battery case and then sealed. As a result, a lithium secondary battery was manufactured.

(b) In the sealing (a), both sides of the battery case having the electrode assembly embedded therein were pressed under a pressure of 3 atm and, thus, internal pressure of the battery case was increased.

Comparative Example 1

A lithium secondary battery was manufactured in the same manner as in Example 1, except that, in the removing (b), both sides of a battery case were not pressed.

Experimental Example 1

The lithium secondary batteries manufactured according to Example 1 and Comparative Example 1 were charged at 0.5 C and discharged at 0.5 C, and then rate characteristics thereof were measured. Results are illustrated in FIGS. 1 and 2 below, respectively.

It can be confirmed that, as illustrated in FIG. 1 below, gas generation in the battery according to Example 1 externally pressed during manufacture of the secondary battery was inhibited or the generated gases were consumed and, as such, cycle characteristics of the battery are constant. However, it can be confirmed that, as illustrated in FIG. 2 below, large amounts of gases exist inside the case of the secondary battery, which was not externally pressed, according to Comparative Example 1 and, as such, cycle characteristics are not constant. This is because the internal pressure of the secondary battery case becomes high when external pressure is applied thereto and, as such, side reaction such as gas generation is decreased. This is also because generated gases are dissolved in the electrolyte under high pressure and, as such, non-uniform reaction due to undissolved gaseous bubbles is decreased.

Experimental Example 2

The lithium secondary batteries manufactured according to Example 1 and Comparative Example 1 were charged at 0.5 C and discharged at 0.5 C. Subsequently, the batteries were decomposed and photographs of separators were taken. The photographs are illustrated in FIGS. 3 and 4 below, respectively.

According to FIG. 3 below, it can be confirmed that amounts of gases inside the battery, which was externally pressed, according to Example 1 and non-uniform reaction thereof were decreased and, as such, separators are uniform. On the other hand, it can be confirmed that, according to FIG. 4 below, non-uniform reaction occurred due to large amounts of gases existing inside the battery, which was not externally pressed, according to Comparative Example 1 and, as such, separators are not uniform.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, since a method of manufacturing a secondary battery according to the present invention includes pressing both sides of a battery case having an electrode assembly embedded therein so as to increase internal pressure of the battery case, generation of carbon dioxide during charge and discharge of the battery may be inhibited and, at the same time, previously generated gases may be consumed by being reduced at a negative electrode. Therefore, side reactions occurring due to large amounts of gases existing inside the battery may be decreased. Accordingly, excellent stability may be exhibited and rate characteristics may also be improved.

The invention claimed is:

1. A method of manufacturing a secondary battery having an electrode assembly sealed therein, the method comprising:

sealing a battery case composed of a rectangular or cylindrical metal can after introducing an electrode assembly having a structure, in which a separator is interposed between a positive electrode and a negative electrode, and an electrolyte thereinto; and removing gases generated at an abnormal operation state of a battery or high temperature from an internal battery environment by pressing both sides of the battery case having the electrode assembly embedded therein in the sealing to increase internal pressure of the battery, wherein the electrode assembly comprises a spinel-structure lithium nickel manganese composite oxide represented by Formula 1 below as a positive electrode active material and a lithium metal oxide represented by Formula 2 below as a negative electrode active material:

$$Li_xM_yMn_{2-y}O_{4-z}A_z \quad (1)$$

wherein $0.9 \leq x \leq 1.2$, $0 < y < 2$, and $0 \leq z < 0.2$,

M is at least one element selected from the group consisting of Al, Mg, Ni, Co, Fe, Cr, V, Ti, Cu, B, Ca, Zn, Zr, Nb, Mo, Sr, Sb, W, Ti, and Bi;

A is at least one monovalent or divalent anion;

$$Li_aM'_bO_{4-c}A_c \quad (2)$$

wherein M' is at least one element selected from the group consisting of Ti, Sn, Cu, Pb, Sb, Zn, Fe, In, Al and Zr;

$0.1 \leq a \leq 4$ and $0.2 \leq b \leq 4$, wherein a and b are determined according to oxidation number of M';

$0 \leq c < 0.2$, wherein c is determined according to oxidation number of A; and A is at least one monovalent or divalent anion, wherein, in the removing, the pressing of the battery case is performed by pressing the both sides of the battery case using a compression plate.

2. The method according to claim 1, wherein pressure applied in the removing is 2 atm to 10 atm.

3. The method according to claim 1, wherein the pressure applied in the removing is 3 atm to 8 atm.

4. The method according to claim 1, wherein the battery case can be used under a pressure of 10 atm.

5. The method according to claim 1, wherein the gases are consumed by being reduced at a negative electrode through applied pressure.

6. The method according to claim 1, wherein the oxide of Formula 1 is represented by Formula 3 below:

$$Li_xNi_yMn_{2-y}O_4 \quad (3)$$

wherein $0.9 \leq x \leq 1.2$ and $0.4 \leq y \leq 0.5$.

7. The method according to claim 1, wherein the oxide of Formula 1 is $LiNi_{0.5}Mn_{1.5}O_4$ or $LiNi_{0.4}Mn_{1.6}O_4$.

8. The method according to claim 1, wherein the oxide of Formula 2 is represented by Formula 4 below:

$$Li_aTi_bO_4 \quad (4)$$

wherein $0.5 \leq a \leq 3$ and $1 \leq b \leq 2.5$.

9. The method according to claim 1, wherein the oxide of Formula 2 is $Li_{1.33}Ti_{1.67}O_4$ or $LiTi_2O_4$.

* * * * *